(12) United States Patent
Shen et al.

(10) Patent No.: US 12,652,392 B2
(45) Date of Patent: Jun. 9, 2026

(54) VIDEO CODING METHOD, APPARATUS, DEVICE, AND MEDIUM

(71) Applicant: HUAWEI TECHNOLOGIES CO., LTD., Shenzhen (CN)

(72) Inventors: Jianqiang Shen, Hangzhou (CN); Yanxing Zeng, Moscow (RU); Junhui Gong, Hangzhou (CN); Boxuan Yue, Shenzhen (CN); Cheng Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 18/192,553

(22) Filed: Mar. 29, 2023

(65) Prior Publication Data

US 2023/0239474 A1 Jul. 27, 2023

Related U.S. Application Data

(63) Continuation of application No. PCT/CN2021/112719, filed on Aug. 16, 2021.

(30) Foreign Application Priority Data

Sep. 30, 2020 (CN) ........................ 202011062370.X

(51) Int. Cl.
*H04N 7/12* (2006.01)
*H04N 19/107* (2014.01)
*H04N 19/124* (2014.01)

(52) U.S. Cl.
CPC ......... *H04N 19/124* (2014.11); *H04N 19/107* (2014.11)

(58) Field of Classification Search
CPC .. H04N 19/124; H04N 19/107; H04N 19/137; H04N 19/172; H04N 19/40; H04N 19/167; H04N 19/177
See application file for complete search history.

(56) References Cited

U.S. PATENT DOCUMENTS 6,256,423 B1 * 7/2001 Krishnamurthy .... H04N 19/198
375/E7.14
2010/0296579 A1 11/2010 Panchal et al.
(Continued)

FOREIGN PATENT DOCUMENTS

CN 111479112 A 7/2020

OTHER PUBLICATIONS

"Series H: Audiovisual and Multimedia Systems Infrastructure of audiovisual services—Coding of moving video—High efficiency video coding," Telecommunication Standardization Sector of ITU, T-REC-H.265, Total 712 pages, International Union of Telecommunication, Geneva, Switzerland (Nov. 2019).
(Continued)

*Primary Examiner* — Gims S Philippe
(74) *Attorney, Agent, or Firm* — Leydig, Voit & Mayer, Ltd.

(57) ABSTRACT

A video compression method, apparatus, and device, and a medium are provided. The method includes: obtaining a video frame, wherein the video frame includes a first dynamic group of pictures and a second dynamic group of pictures; extracting a first I frame in the first dynamic group of pictures, and extracting a second I frame in the second dynamic group of pictures; deleting duplicate data between the first I frame and the second I frame, to obtain a target I frame; and compressing the target I frame. The duplicate data between the first I frame and the second I frame is deleted, without affecting integrity of data of the video frame.

20 Claims, 9 Drawing Sheets

Collection device
201

Storage device
202

Analysis device
203

(56)  References Cited

U.S. PATENT DOCUMENTS

| | | | |
|---|---|---|---|
| 2013/0268502 A1* | 10/2013 | Yang .................... | H04N 19/137 |
| | | | 707/693 |
| 2015/0156511 A1* | 6/2015 | Lundberg ............... | H04N 19/44 |
| | | | 375/240.12 |
| 2019/0104314 A1* | 4/2019 | Yonezawa .............. | H04N 19/51 |
| 2019/0320175 A1* | 10/2019 | Mao ..................... | H04N 19/573 |
| 2020/0137390 A1* | 4/2020 | Lew ..................... | H04N 19/172 |
| 2023/0300426 A1* | 9/2023 | Atluru ............. | H04N 21/44016 |
| | | | 725/146 |

OTHER PUBLICATIONS

"Series H: Audiovisual and Multimedia Systems Infrastructure of audiovisual services—Coding of moving video—Advanced video coding for generic audiovisual services," Telecommunication Standardization Sector of ITU, T-REC-H.264, Total 836 pages, International Union of Telecommunication, Geneva, Switzerland (Jun. 2019).

* cited by examiner

Collection device      Storage device      Analysis device
201      202      203

SDC1

SDC2

SDC3

VCN

VCM

User equipment 1

User equipment 2

Input a video

Process the video

Detect an ROI

Code the video

Output the video

VCN

VCM

701: Obtain a video frame

702: Recognize an ROI

703: Set a QP for each of an ROI and an RONI

704: Extract an I frame and a P frame in the video frame

705: Remove redundancy between a plurality of I frames

706: Compress the I frame

707: Compress the P frame

708: Save a compressed video file

709: Send the video file to the VCM

710: Analyze and recognize the video file

VIDEO CODING METHOD, APPARATUS, DEVICE, AND MEDIUM

CROSS-REFERENCE TO RELATED APPLICATIONS

This application is a continuation of International Application No. PCT/CN2021/112719, filed on Aug. 16, 2021, which claims priority to Chinese Patent Application No. 202011062370.X, filed on Sep. 30, 2020. The disclosures of the aforementioned applications are hereby incorporated by reference in their entireties.

TECHNICAL FIELD

Embodiments of this application relate to the field of computer technologies, and in particular, to a video coding method, apparatus, and device, and a computer-readable storage medium.

BACKGROUND

According to related laws and regulations, video data in the field of security protection needs to be stored for at least 90 days and collected uninterruptedly all day. Therefore, there are great demands for a large network bandwidth and large storage space. Storage costs caused by the great demands for a large network bandwidth and large storage space have become a bottleneck in the industry. In addition, after video data is compressed, compressed video needs to maintain relatively high video quality to complete a video analysis service, such as facial recognition and license plate detection. Therefore, it is one of important means to improve competitiveness of security protection products while video compression is maximized by using a video data compression technology and ensuring high quality of the compressed video.

Refer to a schematic diagram of an existing dynamic group of pictures (GOP) technology in FIG. 1. In a video coding sequence, there are mainly three types of coded frames: an intra coding picture (I) frame, a predictive coding picture (P) frame, and a bidirectional predictive coding picture (B) frame. Specifically, for the I frame, no other picture frame is referred, and only information of the I frame is used for coding. For the P frame, a previous I frame or P frame is used, and inter-frame predictive coding is performed in a motion prediction manner. The B frame provides a highest compression ratio, and requires both a previous picture frame and a subsequent picture frame. Inter-frame bidirectional predictive coding is performed in the motion prediction manner. In the video coding sequence, a GOP means a distance between two I frames, and a reference period means a distance between two P frames.

The GOP technology mainly includes two technical points: A. An interval between I frames may be dynamically adjusted based on a dynamic amount in a scenario. B. A dual-reference frame and a virtual I frame are introduced in the GOP, and an optimal reference block may be selected for the P frame based on a previous frame or the I frame. In addition, the virtual I frame may be flexibly inserted as required based on the I frame but not a previous P frame. The dynamic GOP technology detects a motion status of a moving object in a video stream in real time. For example, when there are few moving objects at night, the dynamic GOP technology selects a relatively large GOP value. In this way, there is a relatively small quantity of I frames, and a quantity of P frames and a quantity of B frames increase. This can save storage space of the video stream.

Because there is a large amount of duplicate data in an entire video file, data is not compressed sufficiently.

SUMMARY

Embodiments of this application provide a video compression method for coding. This method deletes duplicate data between different I frames, reducing space occupied by a video frame. This application further provides a video coding apparatus, a video coding device, a computer-readable storage medium, and a computer program product.

A first aspect of embodiments of this application provides a method for detecting a routing loop. In this method, an original video frame needs to be first obtained. However, when a compressed video stream is obtained, the video stream needs to be decoded into the original video frame.

After the original video frame is obtained, based on a GOP technology, the video frame may include a plurality of GOPs. Each GOP includes one I frame and a plurality of P frames. A first I frame, a second I frame, and a plurality of P frames may be separately extracted from a first GOP and a second GOP in the video frame.

Further, each I frame is a fully compressed frame, and includes a complete picture of a current frame. Therefore, duplicate picture data usually exists between the first I frame and the second I frame. Duplicate data between the first I frame and the second I frame may be removed, to obtain a target I frame. Then the target I frame is compressed. In this embodiment of this application, only duplicate picture data between the first I frame and the second I frame is deleted. After the duplicate picture data is removed, at least one piece of the duplicate picture data is kept in an I frame. Therefore, for an entire video frame, complete picture data is not lost. Therefore, redundant data between the first GOP and the second GOP is reduced, and video quality is not affected. In this embodiment of this application, a plurality of I frames is extracted from a plurality of GOPs. Duplicate data between a plurality of I frames is deleted. This increases a video reduction rate, and reduces transmission costs and storage costs of a video, without affecting the video quality.

Based on the first aspect, an embodiment of this application further provides a first implementation of the first aspect.

The first GOP and the second GOP further include a first P frame and a second P frame. Both the first P frame and the second P frame may be extracted, and then compressed into a same data packet in a standard coding manner.

The P frame is a predictive coding picture, and does not include complete picture data. In this embodiment of this application, lossless compression is performed on both the first P frame and the second P frame, and integrity of data of the video frame is not affected. Therefore, video quality is ensured.

Based on the first implementation in the first aspect, an embodiment of this application further provides a second implementation of the first aspect. Based on a region of interest (ROI) technology, picture data in a video frame may be distinguished as an ROI and an RONI. Therefore, an ROI and an RONI exist in the first I frame and the second I frame, and an ROI and an RONI also exist in the first P frame and the second P frame. A first quantization parameter (QP) may be set for the ROI, and a second QP may be set for the RONI.

Specifically, the QP reflects a spatial compression status. A smaller QP value indicates that picture data is more complete and video quality is higher during compression. A larger QP value indicates that picture data is more likely to be lost and video quality is lower.

An ROI in a target I frame obtained by removing redundancy is compressed based on the first QP. An RONI in the target I frame obtained by removing redundancy is compressed based on the second QP.

In this implementation, compression is further performed on the target I frame obtained by removing the redundancy, further compressing the video data.

Based on the second implementation in the first aspect, an embodiment of this application further provides a third implementation in the first aspect. After the first P frame and the second P frame are extracted, ROIs in the first P frame and the second P frame are compressed based on the first QP. RONIs in the first P frame and the second P frame are compressed based on the second QP.

In this implementation, ROI is extracted from the first P frame and the second P frame and compression is performed on the first P frame and the second P frame.

Based on the second implementation in the first aspect, an embodiment of this application further provides a fourth implementation in the first aspect. In this embodiment of this application, a first QP corresponding to an ROI and a second QP corresponding to an RONI may be separately set according to a bit-rate control algorithm.

Based on the second implementation in the first aspect, the third implementation in the first aspect, or the fourth implementation in the first aspect, an embodiment of this application further provides a fifth implementation in the first aspect.

A value of a first QP corresponding to an ROI is less than a value of a second QP corresponding to an RONI. In this way, when a video frame is compressed, picture quality of the ROI is higher than picture quality of an RONI.

Based on any one of the first aspect, or the first implementation in the first aspect to the fourth implementation in the first aspect, an embodiment of this application further provides a sixth implementation in the first aspect.

In this embodiment of this application, a compressed video stream needs to be decompressed, to obtain an original video frame picture.

Based on any one of the first aspect, or the first implementation in the first aspect to the fourth implementation in the first aspect, an embodiment of this application further provides a seventh implementation in the first aspect.

In an existing GOP technology, an I frame and a P frame in a same frame belong to a same dynamic group of pictures. In this embodiment of this application, redundancy data between a plurality of I frames in a plurality of GOPs is all removed, to obtain a target I frame. A plurality of P frames is all compressed into one data packet. Therefore, after the foregoing compression, a format of a GOP in a video frame is changed.

When a compressed video file in the foregoing manner needs to be decompressed, a target I frame needs to be obtained, and the target I frame is decompressed. Deleted duplicate data between I frames is restored, to obtain an original first I frame and second I frame. Therefore, it can be ensured that video quality after decompression is lossless.

Based on any one of the first implementation in the first aspect to the fourth implementation in the first aspect, an embodiment of this application further provides an eighth implementation in the first aspect.

In this embodiment of this application, a first P frame and a second P frame in a first GOP and a second GOP are packed in a same data packet. The data packet needs to be decompressed. A P frame is decoded based on a corresponding I frame. Therefore, the first P frame needs to be restored based on a decompressed first I frame, and the second P frame needs to be restored based on a decompressed second I frame. Therefore, it can be ensured that an original video frame picture is completely restored.

A second aspect of embodiments of this application provides a video coding apparatus. The video coding apparatus includes:

an obtaining unit, configured to obtain a video frame, where the video frame includes a first dynamic group of pictures and a second dynamic group of pictures, the first dynamic group of pictures includes a first intra coding picture I frame, and the second dynamic group of pictures includes a second I frame;

a first extraction unit, configured to extract the first I frame and the second I frame;

a deletion unit, configured to delete duplicate data between the first I frame and the second I frame, to obtain a target I frame; and a first compression unit, configured to compress the target I frame.

In some possible implementations, the first dynamic group of pictures further includes a first predictive coding picture P frame, and the second dynamic group of pictures further includes a second P frame. The video coding apparatus further includes: a second extraction unit, configured to extract the first P frame and the second P frame; and a second compression unit, configured to compress the first P frame and the second P frame.

In some possible implementations, the video frame includes a region of interest and a region of non-interest. The video coding apparatus further includes:

a configuration unit, configured to set a first quantization parameter for the region of interest, and set a second quantization parameter for the region of non-interest.

The first compression unit is specifically configured to:

compress a region of interest in the target I frame based on the first quantization parameter, and compress a region of non-interest in the target I frame based on the second quantization parameter.

In some possible implementations, the second compression unit is specifically configured to:

compress a region of interest in the first P frame and a region of interest in the second P frame based on the first quantization parameter, and compress a region of non-interest in the first P frame and a region of non-interest in the second P frame based on the second quantization parameter.

In some possible implementations, the configuration unit is specifically configured to:

set the first quantization parameter for the region of interest according to a bit-rate control algorithm, and set the second quantization parameter for the region of non-interest according to the bit-rate control algorithm.

In some possible implementations, the first quantization parameter is less than the second quantization parameter.

In some possible implementations, the video frame is a decompressed video frame.

In some possible implementations, the video coding apparatus further includes a first decompression unit, configured to decompress the compressed target I frame.

In some possible implementations, the video coding apparatus further includes: a second decompression unit, configured to decompress the first P frame and the second P frame that are compressed.

A third aspect of embodiments of this application provides a network device, including:

a processor, a memory, an input/output device, and a bus.

The processor, the memory, and the input/output device are connected to the bus.

The processor is configured to perform the video compression method according to the first aspect or any implementation in the first aspect.

A fourth aspect of embodiments of this application provides a computer-readable storage medium. The computer-readable storage medium stores instructions. When the instructions are run on a device such as a computer device, the device is enabled to perform the method for detecting a routing loop, according to the first aspect or any implementation in the first aspect.

DESCRIPTION OF EMBODIMENTS

Embodiments of this application provide a video compression method, to increase a video reduction rate.

To make the objectives, technical solutions, and advantages of this application clearer, the following further describes the implementations of this application in detail with reference to the accompanying drawings.

Figure 1:
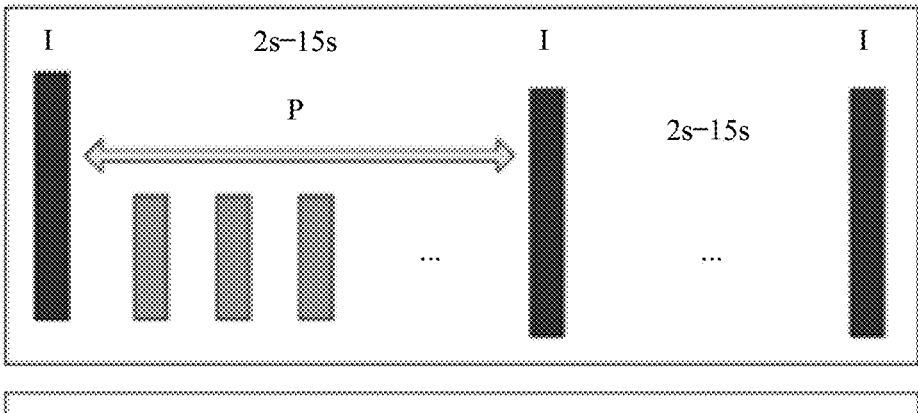
FIG. 1 is a schematic diagram of an existing GOP technology.
Figure 1:
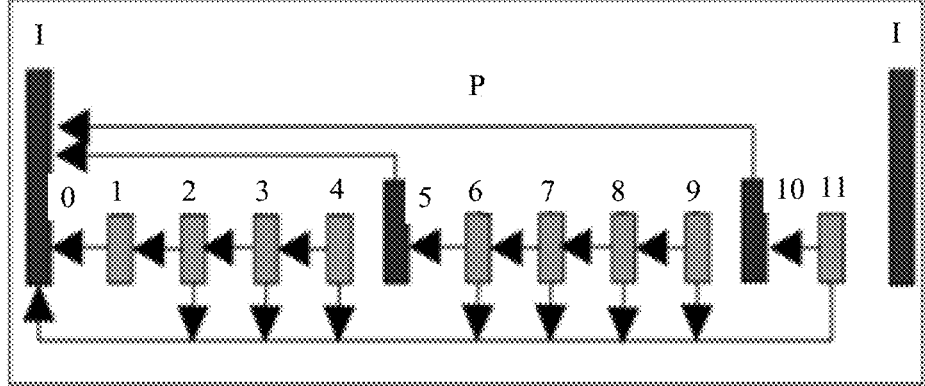
Figure 2:
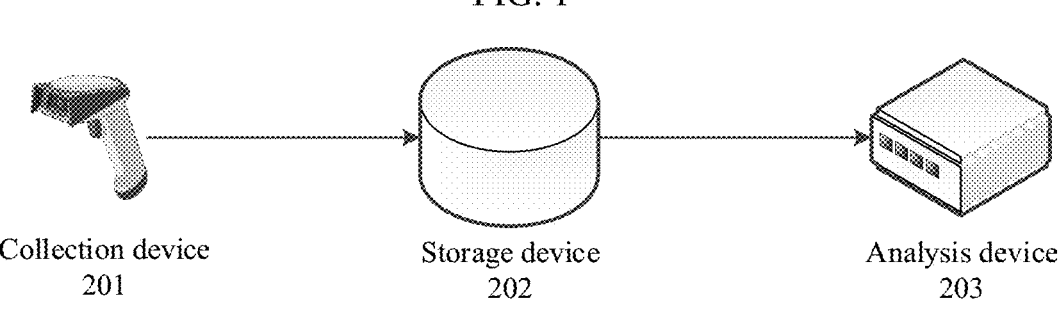
FIG. 2 is a schematic diagram of a structure of an intelligent security protection system.

Refer to an intelligent security protection system shown in FIG. 2. The intelligent security protection system may include three parts: a collection device 201, for example, a network camera or a software-defined camera (SDC), configured to collect data such as a video, a picture, or an audio; a storage device 202, for example, a storage server or a video cloud node (VCN); and an analysis device 203, for example, a video content management (VCM) system.

Figure 3:
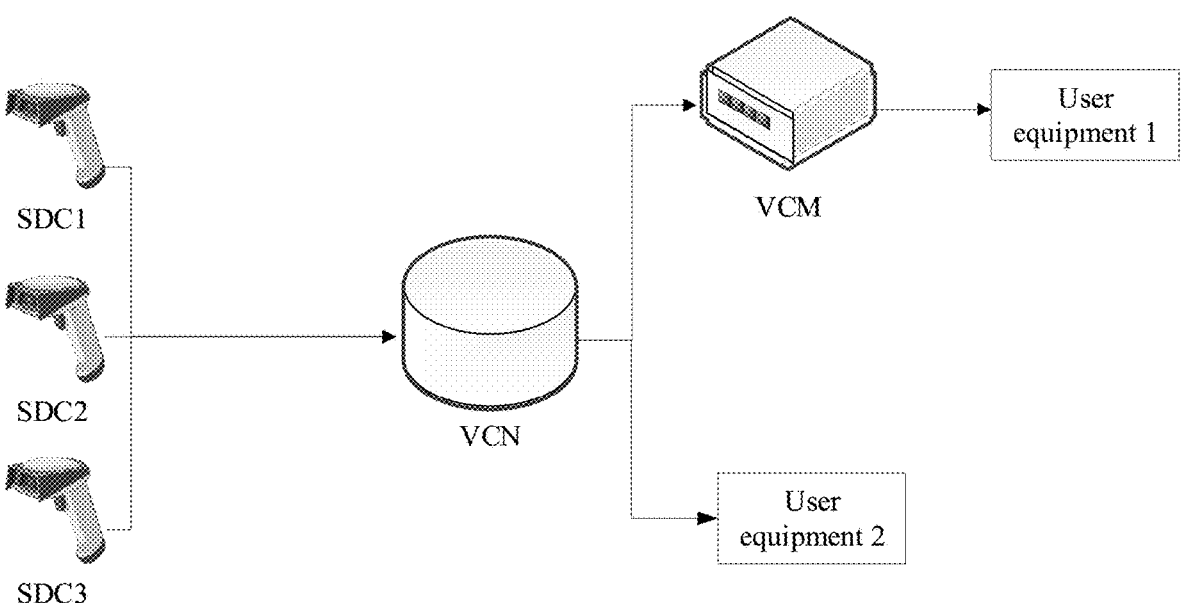
FIG. 3 is a diagram of an entity framework of an intelligent security protection system.

Refer to a diagram of an entity framework of an intelligent security protection system shown in FIG. 3.

After the SDC collects a video, a picture, or audio data, an encoder (based on H.265 or H.264) is used to compress the collected data, to obtain a standard video stream and transmit the stream to a VCN through a network. After receiving the standard video stream, the VCN saves the standard video stream and transmits the standard video stream to the VCM. The VCM performs analysis and recognition (for example, facial recognition or license plate recognition) on the standard video stream and sends analysis data to user equipment such as a personal computer or mobile phone through the network. Alternatively, the VCN may directly send a saved video stream to the user equipment.

A video collected by the collection device usually occupies relatively large storage space, which brings a great challenge to video transmission and storage. Based on this, a video coding technology is introduced in an industry. The video coding is also referred to as video compression, and is essentially a data compression method. During video playback and analysis, original video data may be restored through video decoding. During the video coding, to obtain a relatively high video reduction rate, some redundant information in video data is usually deleted, causing a loss of the video data. Therefore, a quantity of information of a decoded video may be less than that of an original video.

A video compression solution for an existing intelligent security protection system may be roughly classified into two types: a front-end video compression solution and a back-end video compression solution. The front-end video compression solution means that, when a chip of a front-end collection camera has robust computing power, the computing power of the chip of the camera is directly used to perform video compression. An advantage of the technical solution is that both network transmission overheads and back-end storage overheads can be reduced. A disadvantage of the technical solution is that the computing power of the camera is usually insufficient, and therefore video compression cannot be implemented optimally. The back-end video compression solution means a technology that a powerful video compression chip is increased on a side of a back-end storage module to reprocess and re-compress a video, thereby achieving optimal video compression. An advantage of the back-end video compression solution is that centralized resources such as powerful computing power and memory are used to achieve an optimal video reduction effect.

In addition to the GOP technology, an ROI technology is often used in an existing technical solution for a compressed video. Descriptions are provided below.

Figure 4:
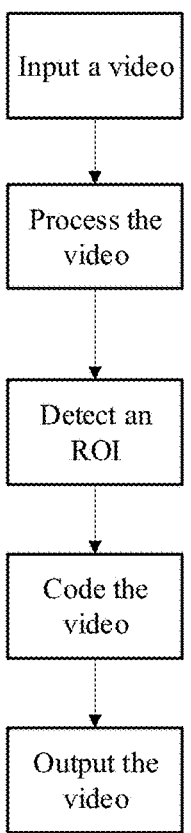
FIG. 4 is a flowchart of an ROI technology.

Refer to a flowchart of an ROI technology shown in FIG. 4. A main principle of the technology is to perform, during video coding of an original video stream, ROI detection on a video frame in the video stream by using various technologies, to recognize a region of the greatest interest, and then draw a region of interest in the video frame by using a box, a circle, an ellipse, or an irregular polygon. A common ROI technology includes various conventional graphics and picture processing methods. After an ROI is recognized, a video coder sets a small compression parameter for the region of interest to ensure high video quality. A larger compression parameter is set for another region of no interest, to obtain a larger video reduction rate.

Figure 5:
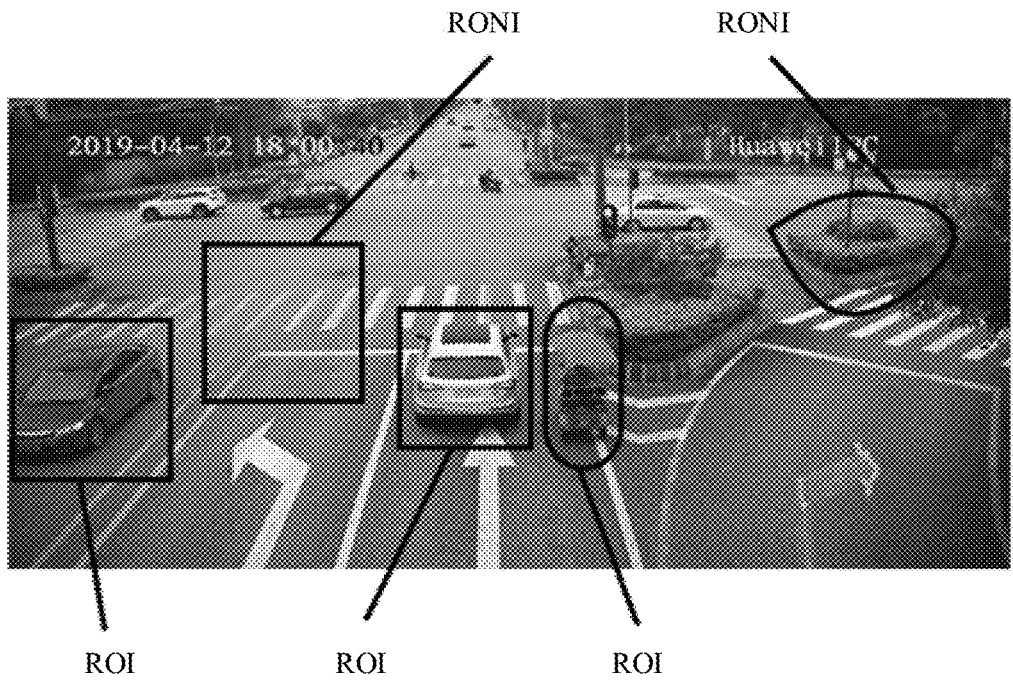
FIG. 5 is a schematic diagram of an ROI technology in a road surveillance scenario.

For example, in a road surveillance scenario in a security protection field shown in FIG. 5, an ROI may be a region such as a vehicle or a pedestrian, and a tree and a road in a background picture may be selected as RONIs. For example, in a warehouse surveillance scenario, an ROI may be a moving warehouse forklift or static cargo, and a background picture in a video may be an RONI. For another example, in a security protection field for a teaching live broadcast scenario in an education industry, an ROI may be a region such as a teacher, a student, or a blackboard.

Figure 6:
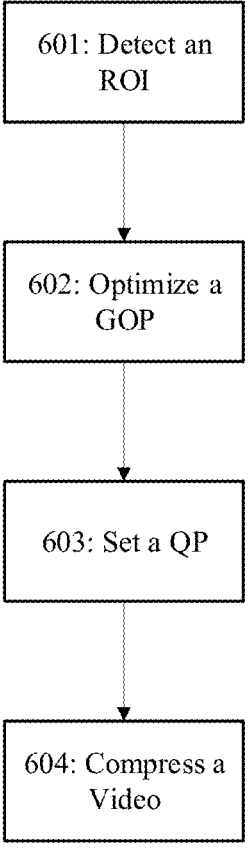
FIG. 6 is a flowchart of existing video compression.

In an actual application scenario of video compression, a video picture is compressed after being processed, for a plurality of times through a combination of compression technologies in a plurality of aspects. FIG. 6 shows an existing video compression process.

601: Perform ROI recognition on a video frame.

A picture in a video frame is classified into an ROI and a RONI based on a preset condition.

602: Dynamically optimize a GOP.

Motion statistics is performed on a video picture stream and redundant information in the GOP is removed.

603: Set a QP based on ROI distribution.

For a video frame with redundant information removed by using a GOP technology, different QPs are set for the ROI and RONI.

604: Compress a video based on the set QPs.

The ROI and RONI are compressed based on the set corresponding QPs, to obtain a standard video stream.

The following describes a video compression solution provided in an embodiment of this application.

It should be noted that a key point of this embodiment of this application is that a video data compression method and processing logic are provided, and are not limited by an actual application scenario. In an actual application process, the solution may be applied to only a security protection system scenario, or may further be applied to another video compression scenario, for example, a video conference scenario, or a video live broadcast scenario in an industry such as new media or online education, or may still further be applied to compression of a local video file. This is not specifically limited herein. For ease of understanding, in this embodiment of this application, a security protection system scenario is used as an example to describe a video compression method.

In this embodiment of this application, the GOP technology is improved. In an actual video compression application scenario, the GOP technology in this embodiment of this application may be combined with an ROI technology to compress a video. Alternatively, the GOP technology in this embodiment of this application may be directly used to compress the video. The following separately describes two different compression solutions.

1. The GOP technology in this embodiment of this application is combined with the ROI technology to compress the video.

Figure 7:
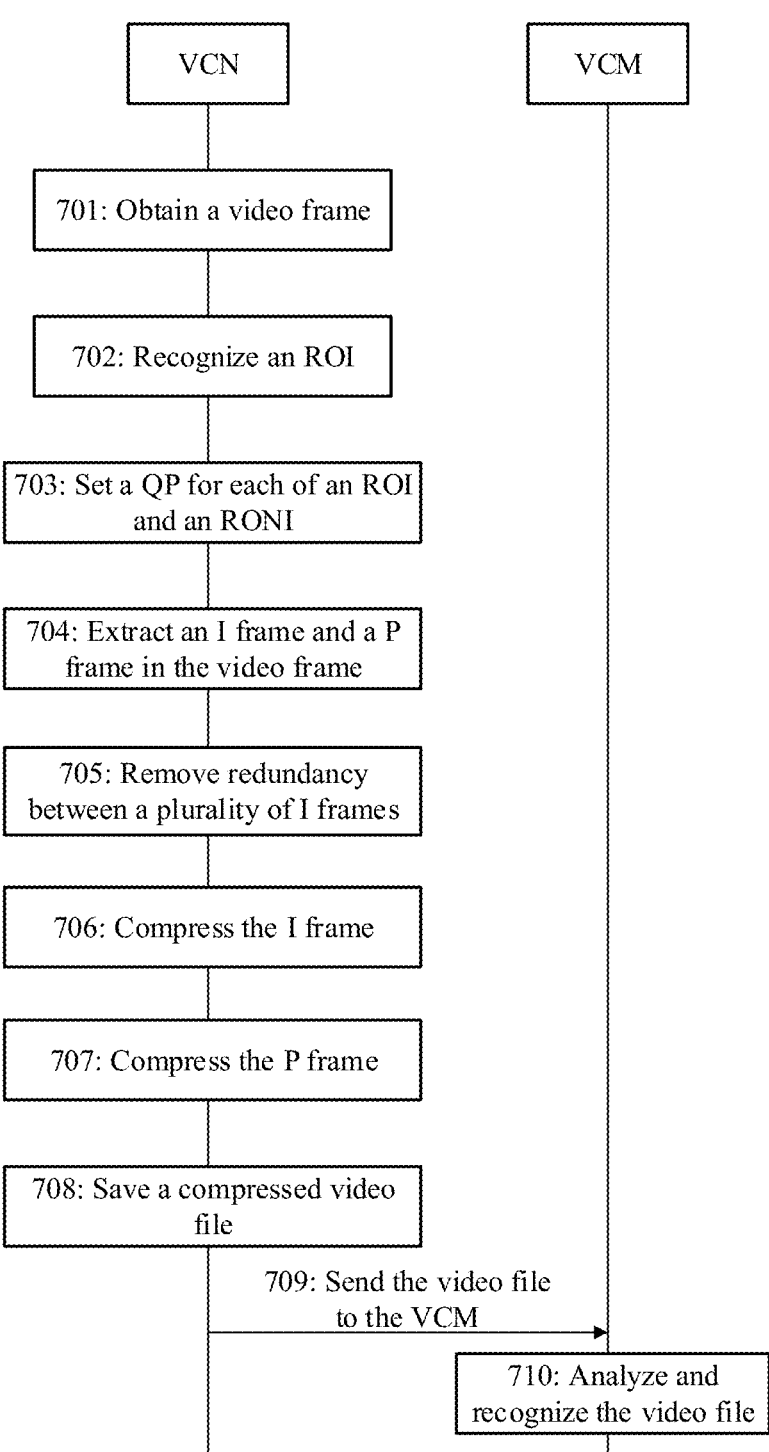
FIG. 7 is a schematic diagram of an embodiment of a video compression method according to an embodiment of this application.

Refer to FIG. 7. In an embodiment of this application, a video compression method includes the following steps.

701: A VCN obtains a video frame.

It should be noted that in this embodiment of this application, the "VCN" is only a device configured to perform a compression function in this embodiment of this application. In actual application, a device that performs the compression function in this embodiment of this application may not be the VCN, for example, may be another back-end storage server, a front-end device such as an SDC, or another independent device, or may be integrated into a front-end collection device, a back-end storage device, or another hardware device, or may be a soft-coded computer program, which is not specifically limited herein. For ease of subsequent description, in this embodiment of this application, the "VCN" is used as an example for description.

Specifically, the video compression method may be applied to the front-end collection device or back-end storage device shown in FIG. 2. If the video compression method is applied to a front-end video compression architecture, an original video frame is input, and subsequent operation steps in this embodiment of this application may be directly performed. If the video compression method is applied to a back-end video reduction architecture, an input compressed video stream needs to be decompressed, to obtain the original video frame, and then operation steps in this embodiment of this application are performed. In this embodiment of this application, the VCN is a back-end storage device. Therefore, the VCN needs to decompress the input compressed video stream to obtain the original video frame.

702: The VCN performs ROI recognition on the obtained video frame.

In a system scenario, a face of a person entering and leaving a community or a license plate of a vehicle passing through the community may be set as an ROI, and a road or tree in a video background may be set as a RONI.

In a technical solution for ROI recognition, the VCN generally recognizes a pre-selected picture of interest based on a preset condition, and sets the picture as an ROI. In this embodiment of this application, an artificial intelligence (AI) algorithm may be used to perform ROI recognition. The VCN can use the AI algorithm to continuously learn an ROI recognition capability based on historic recognition data in a machine learning mode, so that the VCN can more accurately recognize a picture that a user is interested in.

703: The VCN sets different QPs for a recognized ROI and RONI according to a bit-rate control algorithm.

After the VCN recognizes the ROI and RONI, because the ROI is a key region, high video quality and picture details need to be kept after compression, for subsequent video analysis and recognition. The QP reflects compression of spatial details. The video quality after compression is inversely proportional. A smaller QP value indicates higher video quality and better picture details, but a larger size of a corresponding compressed video. Therefore, in this embodiment, the VCN may set, according to the bit-rate control algorithm, a small QP value for the ROI to ensure quality of the compressed video, and a large QP value for the RONI, to obtain a higher video reduction rate.

Therefore, the VCN may set a first QP for the ROI and a second QP for the RONI. The first QP may be less than the second QP.

704: The VCN extracts an I frame and a P frame in the video frame.

Each GOP has one I frame and at least one P frame. The I frame is a fully compressed frame including all information of a frame of a picture. During decoding, only data of a current I frame may be used to reconstruct a complete picture without reference to another picture. The P frame does not have data of a complete picture, but has only data of a difference between a picture of the current frame and a picture of a previous frame. A complete picture is obtained only by decoding in combination with the I frame.

In this embodiment of this application, quantities of extracted I frames and P frames are not limited. The VCN may extract a plurality of I frames and a plurality of P frames from a plurality of GOPs.

In actual application, the VCN cannot process all input video frames at a time due to limitation of memory capacity or computing power. Therefore, a threshold may be set based on the memory capacity or computing power of the VCN. When the quantities of I frames and P frames extracted by the VCN reach the threshold, the VCN pauses extraction of the I frames and P frames, and directly performs step 705.

It should be noted that, because the GOP may further include a B frame. If the B frame exists, the VCN may further extract the B frame.

705: The VCN removes redundancy data between a plurality of I frames.

Because the I frame includes complete picture data, duplicate picture data usually exists between the plurality of the I frames. For example, in a road surveillance scenario of a security protection system, a background street, tree, and road sign in a video picture remain unchanged. Each I frame includes picture data of the street, tree, and road sign. The VCN may delete duplicate pictures between the plurality of I frames. Specifically, after deleting the duplicate data between the plurality of I frames, the VCN further keeps at least one piece of corresponding duplicate data.

The VCN deletes only the duplicate picture data between the I frames. Therefore, complete picture data in a video frame is not lost and video quality is not affected. The method for removing redundancy data between a plurality of I frames does not affect the video quality.

After removing the redundancy data between the extracted I frames, the VCN may determine whether all input video frames are processed. If all input video frames are processed, step 706 is performed. If all input video frames are not processed, step 704 is still performed.

706: The VCN compresses, based on a set QP, the I frames with the redundancy removed.

After deleting redundant data between the plurality of I frames, the VCN may compress the I frames with the redundancy removed. In this embodiment, in step 702 and step 703, ROI recognition has been performed on a video frame, and different QPs are separately set for the ROI and RONI in the video frame. Therefore, after the redundancy data between the plurality of I frames is removed, an ROI in an I frame and an RONI in the I frame may be compressed based on set different QPs.

For example, in this embodiment, the VCN has set a first QP for the ROI and a second QP for the RONI. Therefore, in this case, the VCN may compress, based on a smaller first QP, the ROI in the I frames with redundancy removed, and compress, based on a larger second QP, the RONI in the I frames with the redundancy removed.

In this embodiment of this application, the VCN may compress a plurality of I frames with the redundancy removed, into a same data packet.

707: The VCN compresses the P frame.

In this embodiment, step 707 is similar to step 706. The VCN may compress, based on the smaller first QP, an ROI in P frames with redundancy removed, and compress, based on the larger second QP, an RONI in the P frames with redundancy removed.

In this embodiment of this application, the VCN may compress a plurality of P frames into a same data packet.

It should be noted that a time sequence relationship among step 707, step 705, and step 706 is not limited in this embodiment. To be specific, the VCN may compress the P frame first, and then remove redundancy data between the I frames and compress the I frames. Alternatively, the VCN may remove redundancy data between the I frames and compress the I frames, and then compress the P frames.

708: The VCN saves a compressed video file.

After compressing video data, the VCN may save the compressed video file to a local host or send the compressed video file to another storage device, such as a cloud server.

709: The VCN sends the video file to the VCM.

710: The VCM recognizes the video file.

In a security protection scenario, a user usually needs to analyze and recognize a compressed video, for example, license plate recognition or facial recognition. Therefore, the VCN may send the saved video file to the VCM, and the VCM analyzes and recognizes the video file.

In this embodiment, after obtaining the video frame, the VCN first recognizes an ROI and an RONI in the video frame, sets corresponding QPs separately, removes redundancy data between I frames in the video frame, and then compresses the ROI and the RONI in the video frame based on the set QPs. In this embodiment, a lossy ROI technology is combined with a lossless GOP technology. This can keep picture quality of the region of interest for the user as much as possible, further improve a video reduction rate, and further reduce transmission costs and storage costs of the video file.

2. The GOP technology in this embodiment of this application is used to perform lossless compression on the video file.

Figure 8:
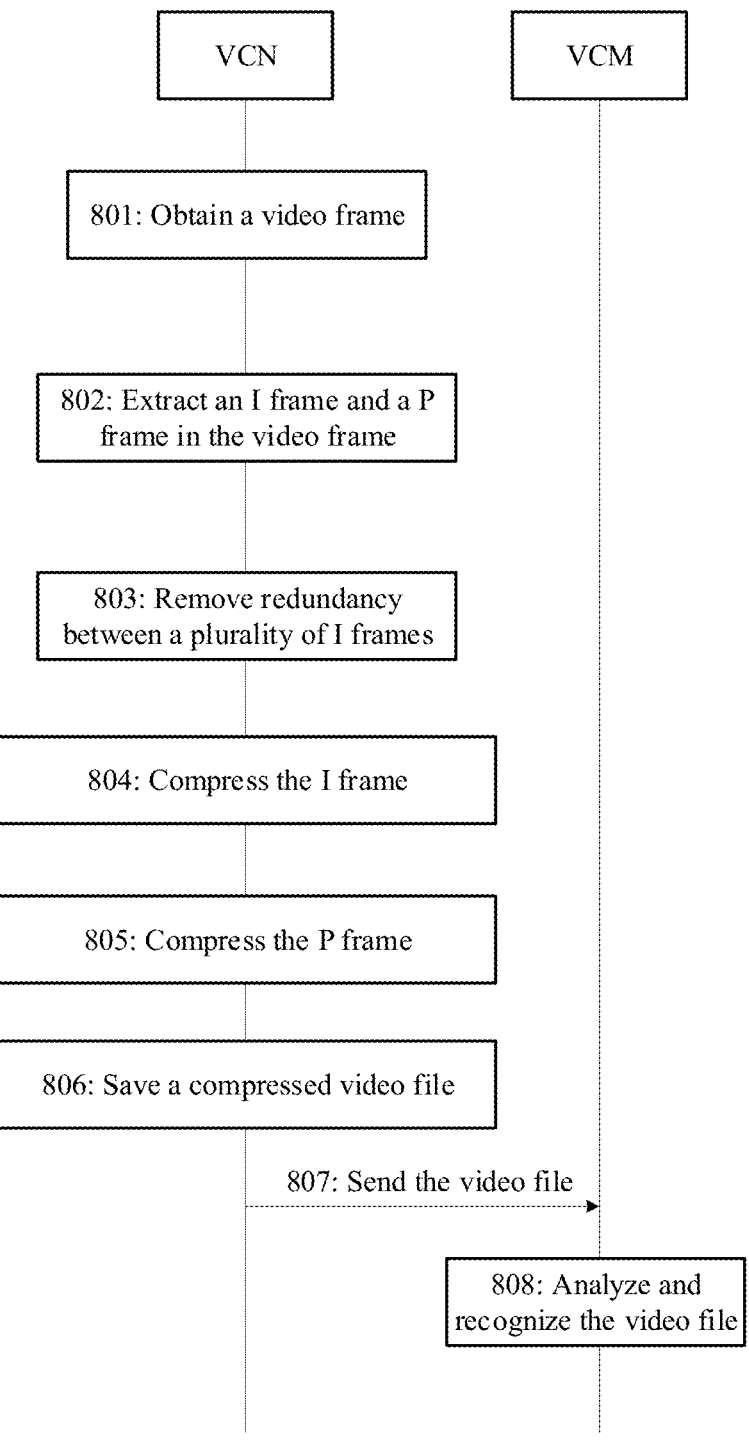
FIG. 8 is a schematic diagram of another embodiment of a video compression method according to an embodiment of this application.

Refer to FIG. 8. In an embodiment of this application, another video compression method includes the following steps.

801: A VCN obtains a video frame.

Step 801 in this embodiment is similar to step 701 shown in FIG. 7. Details are not described herein again.

802: The VCN extracts an I frame and a P frame in the video frame.

803: The VCN removes redundancy data between a plurality of I frames.

804: The VCN compresses the I frames with redundancy removed.

805: The VCN compresses the P frame.

806: The VCN saves a compressed video file.

807: The VCN sends the video file to a VCM.

808: The VCM recognizes the video file.

Step 802 to step 808 in this embodiment are similar to step 704 to step 710 shown in FIG. 7. Details are not described herein again.

It should be noted that in step 804 and step 805 of this embodiment, the VCN compresses, in a lossless coding manner, the P frames and the I frames with the redundancy removed. For example, the VCN may perform compression according to an entropy coding algorithm in a standard, or may use another lossless compression algorithm with a higher compression rate. Generally, entropy coding in a standard uses a coding scheme such as context-based adaptive binary arithmetic coding (CABAC), context-adaptive variable-length coding (CAVLC), or the like.

In this embodiment, redundant information removed by the VCN is duplicate data between a plurality of I frames, and integrity of video data is not affected. Therefore, the entire compression process is lossless to the video quality. In actual application, a lossless video compression technology provided in this embodiment may be completely applied to a requirement of a special customer such as public security (the public security requires that lossy compression cannot be performed on a standardly coded video from a camera).

In a conventional GOP technology, an I frame and a corresponding P frame are compressed into one data packet. In this embodiment of this application, the VCN compresses a plurality of I frames into one data packet, and compresses a plurality of P frames into another data packet. This changes a coding format of the video file. Therefore, when a playback device needs to read the video file, the video file needs to be first decompressed, and then restored to a video stream that is standardly coded.

Figure 9:
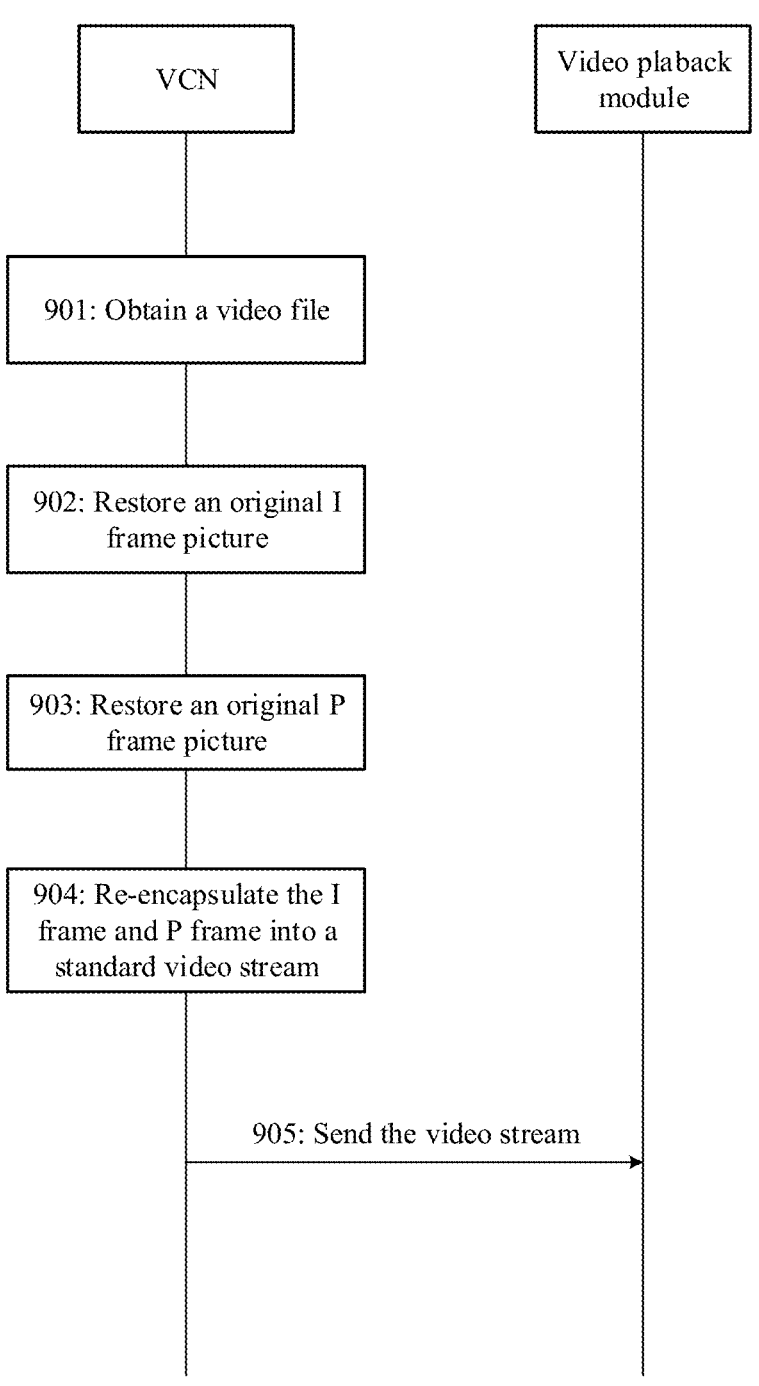
FIG. 9 is a schematic diagram of an embodiment of a video decompression method according to an embodiment of this application.

Refer to FIG. 9. In an embodiment of this application, a video decompression method includes the following steps.

901: A VCN obtains a video file.

The VCN obtains a video stream of a changed coding format. In the video stream, I frames are all coded in one data packet, and P frames are coded in another data packet.

902: The VCN restores an original I frame picture.

The VCN decompresses the data packet that encapsulates the I frames, extracts the I frames, and restores deleted duplicate data of the I frames, to obtain an original complete I frame picture.

903: The VCN restores an original P frame picture.

The P frame is decoded based on a corresponding I frame. Therefore, after the VCN restores the complete I frame, the VCN may restore the P frame based on the I frame, to obtain the original P frame picture.

904: The VCN re-encapsulates a restored I frame and P frame into a standard video stream.

905: The VCN sends a re-encapsulated video stream to a video player.

In this embodiment, the VCN restores deleted duplicate data between I frames to obtain the original complete I frame picture, and decompresses the P frame based on the restored I frame. This can ensure integrity of data of the video frame and video quality.

The following describes a video coding apparatus in an embodiment of this application.

Figure 10:
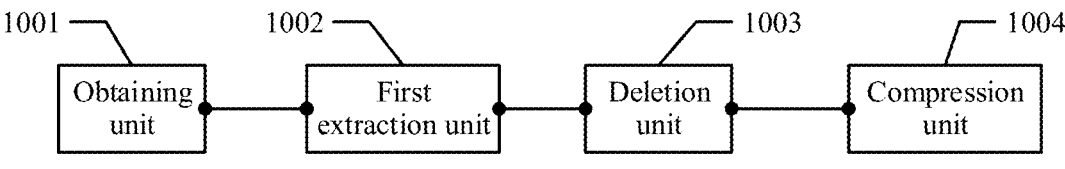
FIG. 10 is a schematic diagram of a structure of a video coding apparatus according to an embodiment of this application.

Refer to FIG. 10. In an embodiment of this application, a structure of a video coding apparatus includes the following units.

An obtaining unit 1001, configured to obtain a video frame. The video frame includes a first dynamic group of pictures and a second dynamic group of pictures. The first dynamic group of pictures includes a first intra coding picture I frame, and the second dynamic group of pictures includes a second I frame.

A first extraction unit 1002, specifically configured to extract the first I frame and the second I frame.

A deletion unit 1003, specifically configured to delete duplicate data between the first I frame and between the second I frames, to obtain a target I frame.

A first compression unit 1004, specifically configured to compress the target I frame.

Figure 11:
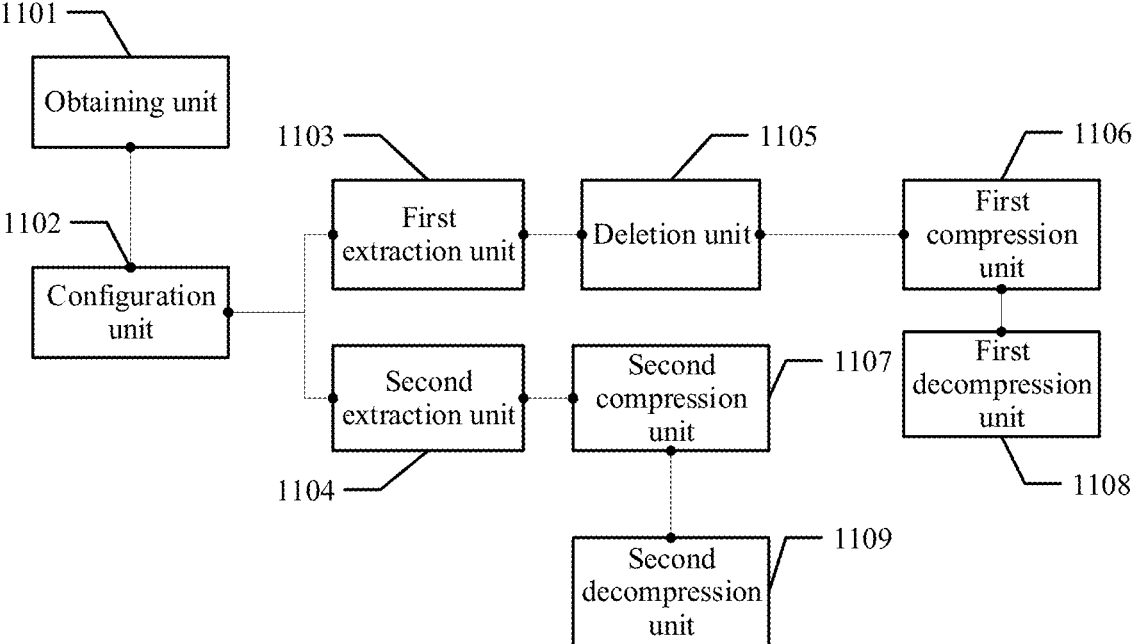
FIG. 11 is another schematic diagram of a structure of a video coding apparatus according to an embodiment of this application.

Refer to FIG. 11. In an embodiment of this application, another structure of the video coding apparatus includes the following units.

An obtaining unit 1101, specifically configured to obtain a video frame. The video frame includes a first dynamic group of pictures and a second dynamic group of pictures. The first dynamic group of pictures includes a first intra coding picture I frame, and the second dynamic group of pictures includes a second I frame.

A configuration unit 1102, specifically configured to set a first quantization parameter for the region of interest, and set a second quantization parameter for the region of non-interest.

A first extraction unit 1103, specifically configured to extract the first I frame and the second I frame.

A second extraction unit 1104, specifically configured to extract the first P frame and the second P frame.

A deletion unit 1105, specifically configured to delete duplicate data between the first I frame and between the second I frames, to obtain a target I frame.

A first compression unit 1106, specifically configured to compress the target I frame.

A second compression unit 1107, specifically configured to compress the first P frame and the second P frame.

A first decompression unit 1108, specifically configured to decompress the compressed target I frame.

A second decompression unit 1109, specifically configured to decompress the first P frame and the second P frame that are compressed.

In some possible implementations, the configuration unit 1102 is specifically configured to:

set the first quantization parameter for the region of interest according to a bit-rate control algorithm, and set the second quantization parameter for the region of non-interest according to the bit-rate control algorithm.

In some possible implementations, the first compression unit 1106 is specifically configured to:

compress a region of interest in the target I frame based on the first quantization parameter, and compress a region of non-interest in the target I frame based on the second quantization parameter.

In some possible implementations, the second compression unit 1107 is specifically configured to:

compress a region of interest in the first P frame and a region of interest in the second P frame based on the first quantization parameter, and compress a region of non-interest in the first P frame and a region of non-interest in the second P frame based on the second quantization parameter.

In this embodiment, a process executed by each unit in the video coding apparatus is similar to the method processes described in the embodiments shown in FIG. 7 to FIG. 9. Details are not described herein again.

Figure 12:
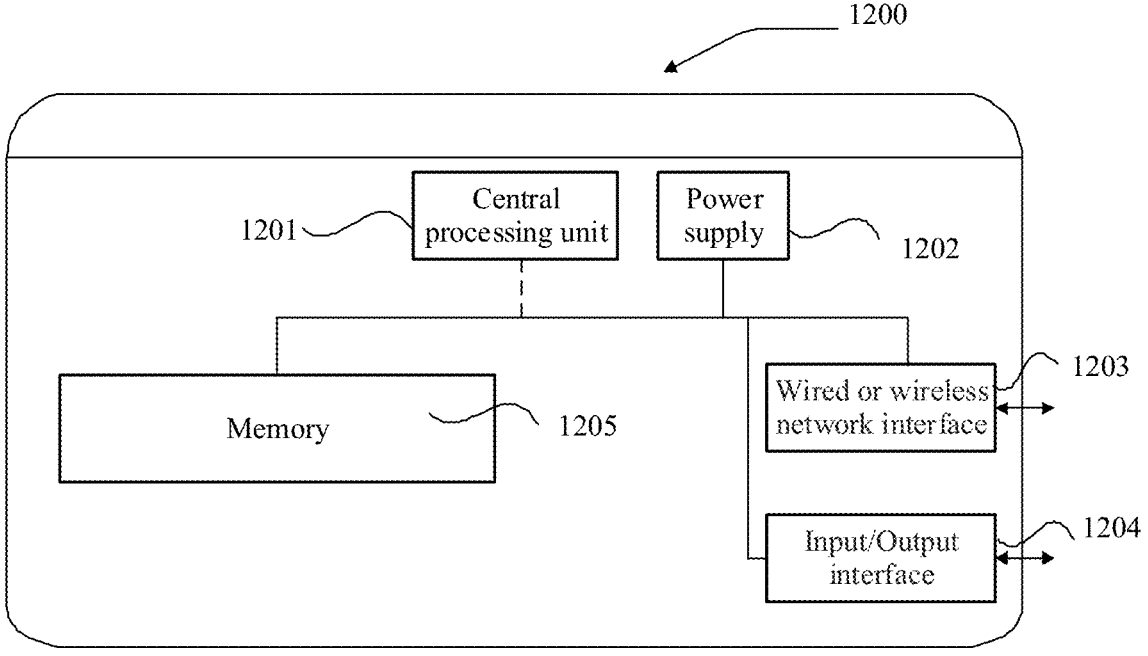
FIG. 12 is still another schematic diagram of a structure of a video coding apparatus according to an embodiment of this application.

FIG. 12 is a schematic diagram of a structure of a video coding apparatus according to an embodiment of this application. The video coding apparatus 1200 may include one or more central processing units (CPU) 1201 and a memory 1205. The memory 1205 stores one or more application programs or data.

The memory 1205 may be a volatile memory or a persistent memory. A program stored in the memory 1205 may include one or more modules. Each module may include a series of instruction operations on the coding module. Further, the central processing unit 1201 may be configured to communicate with the memory 1205, and perform, on the video coding apparatus 1200, a series of instruction operations in the memory 1205.

The video coding apparatus 1200 may further include one or more power supplies 1202, one or more wired or wireless network interfaces 1203, one or more input/output interfaces 1204, and/or one or more operating systems, such as a Windows Server™, Mac OS X™, Unix™, Linux™, or FreeBSDT™.

The video coding apparatus 1200 or the central processing unit 1201 may perform operations performed by the VCN in the embodiments shown in FIG. 7 to FIG. 9. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store a program code, such as a USB flash drive, a removable hard disk, a read-only memory (ROM), a random access memory (RAM), a magnetic disk, or an optical disc.

What is claimed is:

1. A video compression method applied to a video coding device, the method comprising:

obtaining a video frame comprising a first dynamic group of pictures and a second dynamic group of pictures,
wherein the first dynamic group of pictures comprises a first intra coding picture (I frame), and the second dynamic group of pictures comprises a second I frame, and
wherein the first dynamic group of pictures is different from the second dynamic group of pictures;
extracting the first I frame from the first dynamic group of pictures and the second I frame from the second dynamic group of pictures;
identifying a plurality of objects present in both the first I frame and the second I frame,
wherein, in each of the first and second I frames, the plurality of objects occupy distinct regions within the respective I frame;
deleting duplicate data of the plurality of objects between the first I frame and the second I frame to obtain a target I frame; and
compressing the target I frame.

2. The video compression method according to claim 1, wherein the first dynamic group of pictures further comprises a first predictive coding picture (P frame), the second dynamic group of pictures further comprises a second P frame, and the method further comprises:

extracting the first P frame and the second P frame; and
compressing the first P frame and the second P frame.

3. The video compression method according to claim 2, wherein the video frame comprises a region of interest and a region of non-interest, and the method further comprises:

setting a first quantization parameter for the region of interest, and setting a second quantization parameter for the region of non-interest; and
wherein the compressing the target I frame comprises:
compressing a region of interest in the target I frame based on the first quantization parameter, and compressing a region of non-interest in the target I frame based on the second quantization parameter.

4. The video compression method according to claim 3, wherein the compressing the first P frame and the second P frame comprises:

compressing a region of interest in the first P frame and a region of interest in the second P frame based on the first quantization parameter, and compressing a region of non-interest in the first P frame and a region of non-interest in the second P frame based on the second quantization parameter.

5. The video compression method according to claim 3, wherein the setting the first quantization parameter for the region of interest, and setting the second quantization parameter for the region of non-interest comprises:

setting the first quantization parameter for the region of interest according to a bit-rate control algorithm, and setting the second quantization parameter for the region of non-interest according to the bit-rate control algorithm.

6. The video compression method according to claim 3, wherein a value of the first quantization parameter is less than a value of the second quantization parameter.

7. The video compression method according to claim 1, wherein the video frame is a decompressed video frame.

8. The video compression method according to claim 1, wherein after compressing the target I frame, the method further comprises decompressing the compressed target I frame.

9. The video compression method according to claim 2, wherein after compressing the first P frame and the second P frame, the method further comprises:

decompressing the first P frame and the second P frame that are compressed.

10. A video coding device comprising a processor, an input/output device, and a bus, wherein the processor and the input/output device are connected to the bus, and the processor is configured to:

obtain a video frame comprising a first dynamic group of pictures and a second dynamic group of pictures,
wherein the first dynamic group of pictures comprises a first intra coding picture (I frame), and the second dynamic group of pictures comprises a second I frame, and
wherein the first dynamic group of pictures is different from the second dynamic group of pictures;
extract the first I frame from the first dynamic group of pictures and the second I frame from the second dynamic group of pictures;
identify a plurality of objects present in both the first I frame and the second I frame, wherein, in each of the first and second I frames, the plurality of objects occupy distinct regions within the respective I frame;
delete duplicate data of the plurality of objects between the first I frame and the second I frame to obtain a target I frame; and
compress the target I frame.

11. The video coding device according to claim 10, wherein the first dynamic group of pictures further comprises a first predictive coding picture (P frame), the second dynamic group of pictures further comprises a second P frame, and the processor is further configured to:

extract the first P frame and the second P frame; and compress the first P frame and the second P frame.

12. The video coding device according to claim 11, wherein the video frame comprises a region of interest and a region of non-interest, and the processor is further configured to:

set a first quantization parameter for the region of interest, and set a second quantization parameter for the region of non-interest; and compress a region of interest in the target I frame based on the first quantization parameter, and compress a region of non-interest in the target I frame based on the second quantization parameter.

13. The video coding device according to claim 12, wherein the processor is further configured to:

compress a region of interest in the first P frame and a region of interest in the second P frame based on the first quantization parameter, and compressing a region of non-interest in the first P frame and a region of non-interest in the second P frame based on the second quantization parameter.

14. The video coding device according to claim 12, wherein the processor is further configured to:

set the first quantization parameter for the region of interest according to a bit-rate control algorithm, and set the second quantization parameter for the region of non-interest according to the bit-rate control algorithm.

15. The video coding device according to claim 12, wherein a value of the first quantization parameter is less than a value of the second quantization parameter.

16. The video coding device according to claim 10, wherein the video frame is a decompressed video frame.

17. The video coding device according to claim 10, wherein after compressing the target I frame, the processor is further configured to decompress the compressed target I frame.

18. The video coding device according to claim 11, wherein after compressing the first P frame and the second P frame, the processor is further configured to decompress the first P frame and the second P frame that are compressed.

19. A non-transitory computer-readable storage medium, comprising instructions, wherein when the instructions are run on a computer, the computer is enabled to perform the following operations including:

obtaining a video frame comprising a first dynamic group of pictures and a second dynamic group of pictures, wherein the first dynamic group of pictures comprises a first intra coding picture (I frame), and the second dynamic group of pictures comprises a second I frame, and wherein the first dynamic group of pictures is different from the second dynamic group of pictures;

extracting the first I frame from the first dynamic group of pictures and the second I frame from the second dynamic group of pictures;

identifying a plurality of objects present in both the first I frame and the second I frame, wherein, in each of the first and second I frames the plurality of objects occupy distinct regions within the respective I frame;

deleting duplicate data of the plurality of objects between the first I frame and the second I frame to obtain a target I frame; and compressing the target I frame.

20. The computer-readable storage medium according to claim 19, wherein the operations further include:

extracting a first predictive coding picture (P frame) in the first dynamic group and a second P frame in the second dynamic group; and compressing the first P frame and the second P frame.

\* \* \* \* \*